(12) United States Patent
Osenga

(10) Patent No.: US 10,714,844 B2
(45) Date of Patent: Jul. 14, 2020

(54) GROUNDING CLAMPS AND TORQUE-CONTROLLED FASTENERS

(71) Applicant: Panduit Corp., Tinley Park, IL (US)

(72) Inventor: David K. Osenga, Munster, IN (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 16/146,127

(22) Filed: Sep. 28, 2018

(65) Prior Publication Data
US 2019/0103683 A1   Apr. 4, 2019

Related U.S. Application Data

(60) Provisional application No. 62/566,646, filed on Oct. 2, 2017, provisional application No. 62/574,236, filed on Oct. 19, 2017.

(51) Int. Cl.
| | |
|---|---|
| *H01R 4/66* | (2006.01) |
| *H01R 4/36* | (2006.01) |
| *F16B 2/12* | (2006.01) |
| *H01R 4/40* | (2006.01) |
| *H01R 4/64* | (2006.01) |
| *H01R 11/15* | (2006.01) |
| *H02G 1/02* | (2006.01) |
| *B25B 5/10* | (2006.01) |
| *B25B 23/142* | (2006.01) |
| *H01R 4/50* | (2006.01) |

(Continued)

(52) U.S. Cl.
CPC .......... *H01R 4/36* (2013.01); *B25B 5/10* (2013.01); *B25B 5/103* (2013.01); *B25B 5/163* (2013.01); *B25B 23/1415* (2013.01); *B25B 23/1427* (2013.01); *F16B 2/12* (2013.01); *H01R 4/40* (2013.01); *H01R 4/5075* (2013.01); *H01R 4/643* (2013.01); *H01R 11/15* (2013.01); *H01R 11/24* (2013.01); *H02G 1/02* (2013.01); *H01R 4/42* (2013.01); *H02G 13/40* (2013.01)

(58) Field of Classification Search
CPC .......... H01R 4/36; H01R 4/42; H01R 4/5075; H01R 11/15; H01R 11/24; H01R 4/643; H01R 4/40; B25B 5/103; B25B 5/163; B25B 23/1415; B25B 23/1427; B25B 5/10; H02G 1/02; H02G 13/40; F16B 2/12
USPC ................. 439/811, 100, 785, 802, 803, 804
See application file for complete search history.

(56) References Cited

U.S. PATENT DOCUMENTS

| | | | |
|---|---|---|---|
| 2,547,932 A | * | 4/1951 | Downs, Jr. ............... H01R 4/50 439/100 |
| 2,679,032 A | | 5/1954 | Thomas, Jr. et al. |

(Continued)

FOREIGN PATENT DOCUMENTS

| | | |
|---|---|---|
| DE | 102011107049 A1 | 1/2013 |
| FR | 2598855 A1 | 11/1987 |
| JP | 2016103403 A | 6/2016 |

*Primary Examiner* — Abdullah A Riyami
*Assistant Examiner* — Nelson R. Burgos-Guntin
(74) *Attorney, Agent, or Firm* — Christopher S. Clancy; James H. Williams; Peter S. Lee

(57) ABSTRACT

Various implementations of grounding clamps and torque-controlled fasteners are disclosed. The grounding clamps may be used to attach grounding conductors to various structures, such as pipes, conduit, grounding rods etc. The torque-controlled fasteners may use various techniques to control the amount of torque applied to the fasteners used with the grounding clamps described herein.

14 Claims, 7 Drawing Sheets

(51) Int. Cl.
  *B25B 23/14*   (2006.01)
  *B25B 5/16*    (2006.01)
  *H01R 11/24*   (2006.01)
  *H01R 4/42*    (2006.01)
  *H02G 13/00*   (2006.01)

(56) References Cited

U.S. PATENT DOCUMENTS

| | | | |
|---|---|---|---|
| 2,698,422 A | | 12/1954 | Turner |
| 3,892,455 A | * | 7/1975 | Sotolongo ............... H01R 4/44 |
| | | | 439/100 |
| 3,985,411 A | * | 10/1976 | Mooney ............... H01R 4/643 |
| | | | 439/791 |
| D243,404 S | * | 2/1977 | Mooney ....................... D13/149 |
| 4,067,371 A | | 1/1978 | Stencel |
| 4,438,958 A | * | 3/1984 | De Cenzo ............... F16L 21/06 |
| | | | 174/94 S |
| 4,623,204 A | | 11/1986 | Auclair |
| 4,626,051 A | | 12/1986 | Franks, Jr. |
| 4,812,095 A | | 3/1989 | Piacenti et al. |
| 4,846,011 A | | 7/1989 | Gaffney |
| 1,418,650 A | | 6/1992 | Johnson |
| 5,368,480 A | | 11/1994 | Balfour et al. |
| 5,556,299 A | * | 9/1996 | Finke ....................... H01R 11/15 |
| | | | 439/479 |
| 5,911,585 A | * | 6/1999 | Zwit ....................... H01R 4/643 |
| | | | 439/100 |
| 6,840,782 B1 | * | 1/2005 | Borden ................... H01R 4/643 |
| | | | 439/92 |
| 6,884,224 B2 | | 4/2005 | Dalton |
| 6,976,857 B1 | * | 12/2005 | Shukla ..................... H01R 4/46 |
| | | | 439/100 |
| 7,182,611 B2 | * | 2/2007 | Borden ................... H01R 4/643 |
| | | | 439/92 |
| 7,794,243 B1 | * | 9/2010 | Rzasa ..................... H01R 4/643 |
| | | | 174/78 |
| 8,021,169 B1 | * | 9/2011 | Smith ....................... H01R 4/36 |
| | | | 439/100 |
| 8,317,526 B2 | * | 11/2012 | Gardner ................... H01R 4/36 |
| | | | 24/489 |
| 8,496,145 B2 | * | 7/2013 | Sautter ................... B60R 9/045 |
| | | | 224/315 |
| 8,556,146 B2 | * | 10/2013 | Sautter ..................... B60R 9/08 |
| | | | 224/325 |
| 8,864,504 B1 | * | 10/2014 | Gretz ....................... H01R 4/66 |
| | | | 439/100 |
| 8,899,998 B2 | * | 12/2014 | Pyron ....................... H01R 4/30 |
| | | | 439/100 |
| 9,381,866 B2 | * | 7/2016 | Sautter ................... B60R 9/045 |
| 10,040,403 B2 | * | 8/2018 | McFadden ............... B60R 9/05 |
| 2005/0008446 A1 | | 1/2005 | Allen |
| 2005/0267477 A1 | | 12/2005 | Jackson |
| 2015/0132981 A1 | * | 5/2015 | McCammon ............ H02G 7/04 |
| | | | 439/258 |
| 2019/0103683 A1 | * | 4/2019 | Osenga ................... H01R 4/643 |

\* cited by examiner

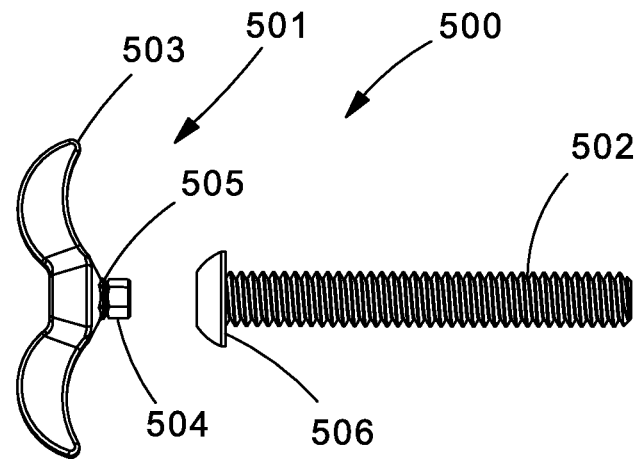
Fig.5a
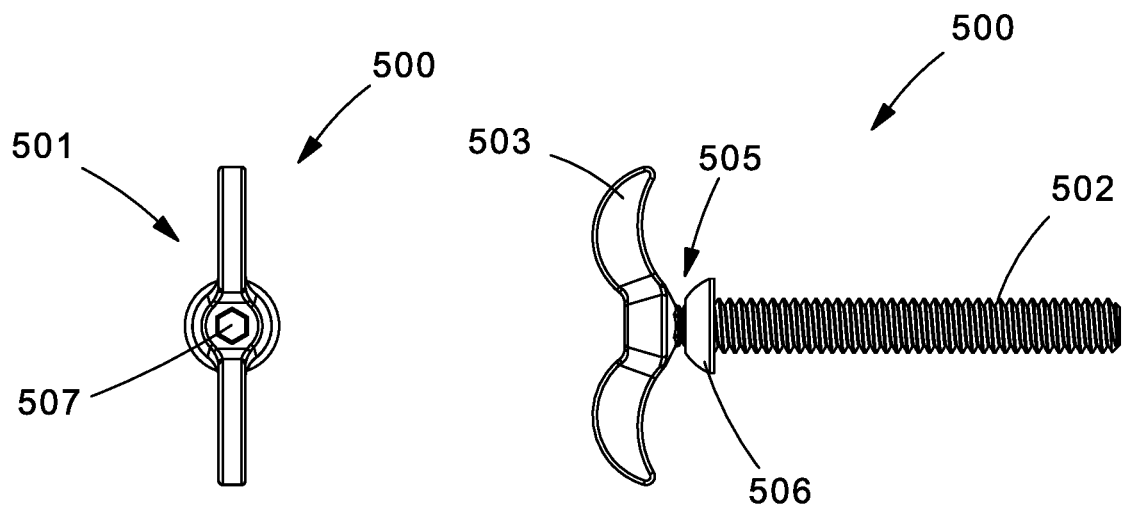
Fig.5b  Fig.5c

GROUNDING CLAMPS AND TORQUE-CONTROLLED FASTENERS

CROSS REFERENCE TO RELATED APPLICATIONS

This application claims priority to U.S. Provisional Application No. 62/566,646, filed Oct. 2, 2017 and U.S. Provisional Application No. 62/574,236, Filed Oct. 19, 2017, the subject matter of each is hereby incorporated by reference in its entirety.

BACKGROUND

Grounding clamps may be used to attach grounding conductors to various types of pipes, conduit, grounding rods, or other structures in many types of grounding applications.

In one implementation, a grounding clamp may include a body that includes a bottom half and a top half. The body halves may be held together by a pair of threaded fasteners on opposing sides of the two body halves. A first side (the "pivot side") of the clamp body may function as a pivot point such that the top half may swing relative to the bottom half so that the clamp may open to be attached to a structure. To attach the grounding clamp to a structure such as a pipe, the threaded fasteners on each end of the body halves may be adjusted until the top half and bottom half can fit around the pipe. The clamp may be swung closed such that the top half pivots about the pivot side until a hook in the second side of the top half engages the threaded fastener on the second side. The two threaded fasteners may then be tightened down until the clamp body applies a desired amount of force on the pipe to keep the clamp in place.

Installation of the aforementioned grounding clamp is inefficient for a number of reasons. First of all, installation can be time consuming because an installer has to adjust the two threaded fasteners so that there is enough space between the top half and bottom half of the clamp for the clamp to be swung closed over a pipe. This may take numerous trial and error attempts by the installer until a sufficient amount of space between the halves is achieved. Once the clamp is over the pipe, the installer has to alternate between tightening down the two threaded fasteners in equal increments so that clamping force is applied evenly to the pipe on both sides.

Another difficulty in installing the aforementioned grounding clamp is that installation typically requires a two-hands to perform. This makes installation difficult in tight installation environments or environments where the installer does not have a good line of sight to the installation point. For example, the installer may be installing a grounding conductor jumper between two pipes near a smart water meter, which may be in a tight space in a house or submerged in a drainage basin.

Moreover, there is no way to determine the amount of torque applied to the fasteners that come with the grounding clamp without the use of a specialized torque-controlled driver. This requires the installer to carry specialized tools to the jobsite and adds another element to which the installer must focus attention to during installation.

BRIEF DESCRIPTION OF THE DRAWINGS

The following detailed description references the drawings, wherein:

FIGS. 5a-5c are illustrations of another example implementation of a torque-controlled fastener system.

DETAILED DESCRIPTION

Figure 1A:
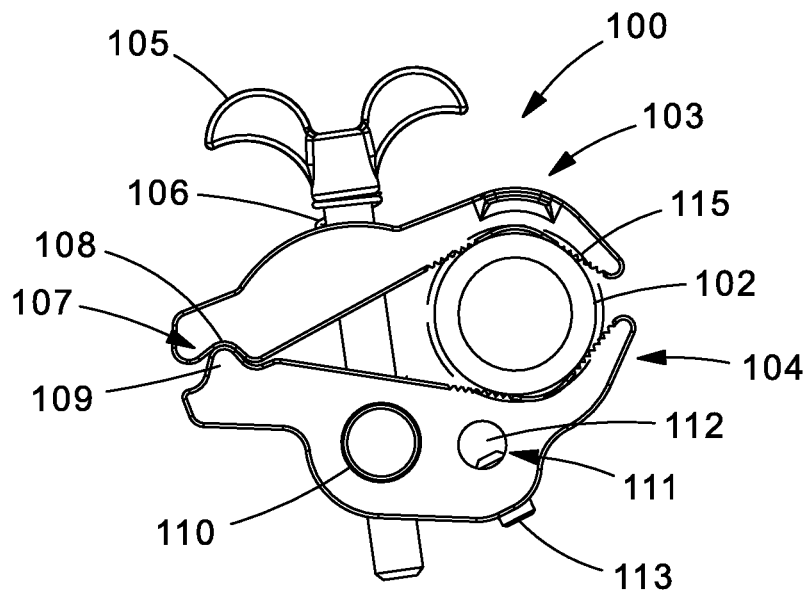
FIGS. 1a and 1b are illustrations of an example implementation of a grounding clamp.

The disclosed grounding clamp solves or improves upon one or more of the above noted and/or other problems and disadvantages with prior products and methods. Examples disclosed herein illustrate various implementations of grounding clamps and torque-controlled fasteners. The disclosed grounding clamps are easy to install without significantly increasing the cost of the clamp. In some implementations, the clamps may be easy to install in tight places and places with poor visibility, even with only one hand. Moreover, the disclosed torque-controlled fasteners are able to control the torque applied to fasteners that can be used with the disclosed grounding clamps, which ensure that a specified amount of torque is applied during every installation without the use of specialized torque drivers.

Reference will now be made to the accompanying drawings. Wherever possible, the same reference numbers are used in the drawings and the following description to refer to the same or similar parts. It is to be expressly understood, however, that the drawings are for illustration and description purposes only. While several examples are described in this document, modifications, adaptations, and other implementations are possible. Accordingly, the following detailed description does not limit the disclosed examples. Instead, the proper scope of the disclosed examples may be defined by the appended claims.

Figure 1B:
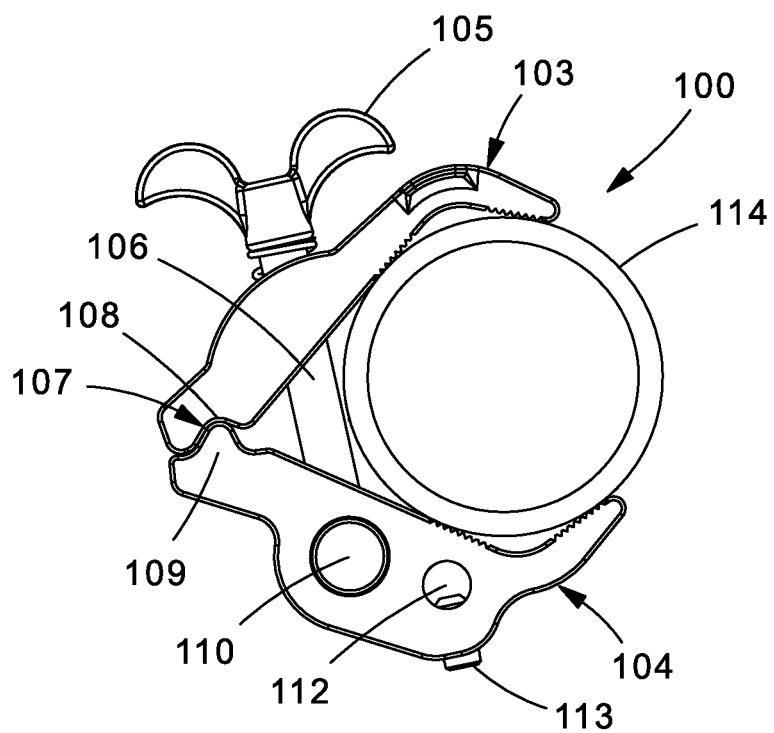

FIGS. 1a and 1b are illustrations of an example grounding clamp 100. Grounding clamp 100 may be a jaw-style clamp. The "jaw" may be formed by a top jaw 103 and a bottom jaw 104. Top jaw 103 and bottom jaw 104 may have concave ends such that a recess 115 is formed when the jaws are clamped together in a closed position. Recess 115 may provide a space in which a structure (e.g., pipe 102, pipe 114, etc.) can fit. Top jaw 103 and bottom jaw 104 may be formed of a conductive material, such as a material with at least 80% copper, so as to provide a grounding path between a grounding conductor (not shown) and the structure to which grounding clamp 100 is attached. In some implementations, only one of top jaw 103 and bottom jaw 104 may be formed of a conductive material to save costs. In this implantation, the jaw 103 or 104 to which the grounding conductor is attached should be the jaw 103 or 104 formed of conductive material to provide a grounding path to the structure.

Top jaw 103 and bottom jaw 104 may be rotatable about a pivot point 107 at a first end of top jaw 103 and bottom jaw 104 in a jaw-like fashion. Instead of being fixed together at pivot point 107 at the first end, a protrusion 109 in the first end of bottom jaw 104 may fit into a groove 108 in the first end of top jaw 108. A compression force applied by a spring 106 may keep the two jaw pieces held together. Other variations of pivot point 107 may be used. For example, protrusion 109 and groove 108 may be swapped such that protrusion 109 is included in top jaw 103 and groove 108 is included in bottom jaw 104. In another variation, instead of using a protrusion, the grounding conductor may be placed at the first end of grounding clamp 100 such that the grounding conductor serves as protrusion 109. In this variation, the grounding conductor is held in place in groove 108 by a compression force.

Spring 106 may be wrapped around a fastener 105 and may apply a biasing compression force top jaw 103. As shown in FIGS. 1a and 1b, spring 106 may be spirally wound around faster 105. However, other types and configurations of springs may be used to apply the compression force. The biasing force applied by spring 106 to top jaw 103 may bias grounding clamp 100 in a closed position. This allows for easy installation and tightening of grounding clamp 100 because the compression force applied by spring 106 holds the clamp in place against the structure so that the installer does not have to. As an example, to fit grounding clamp 100 over pipe 102, the installer may open the jaws of grounding clamp 100 by overcoming the biasing compression force of spring 106, fitting the jaws over pipe 102 so that pipe 102 is positioned in recess 115, and let go of the jaws so that the biasing compression force of spring 106 causes the jaws to clamp around pipe 102. The installer may then tighten faster 105 to tighten top jaw 103 and bottom jaw 104 around pipe 102 for final installation.

Fastener 105 may be implemented by many types of fasteners. In the example shown in FIGS. 1a and 1b, fastener 105 may be a threaded fastener that extends through top jaw 103 and at least partially through bottom jaw 104 into a pivoting nut 110 located in bottom jaw 104. A torque may be applied to fastener 105 to loosen and tighten grounding clamp 100. As fastener 105 is loosened and tightened, top jaw 103 and bottom jaw 104 may open and close in a jaw-like fashion. In some implementations, fastener 105 may be implemented by the torque-controlled fasteners described below in reference to FIGS. 4a-4d and 5a-5c.

The grounding conductor may be attached to grounding clamp 100 at attachment port 111. Attachment port 111 may include a through hole 112 in bottom jaw 104 (or top jaw 103) and a securing screw 113. The installer may place an end of the grounding conductor through through hole 112 and tighten securing screw 113 to secure the grounding conductor in place. Securing screw 113 may be implemented as a Philips head, slotted head, hex head, wing head, or any other equivalent fastener.

Figure 2A:
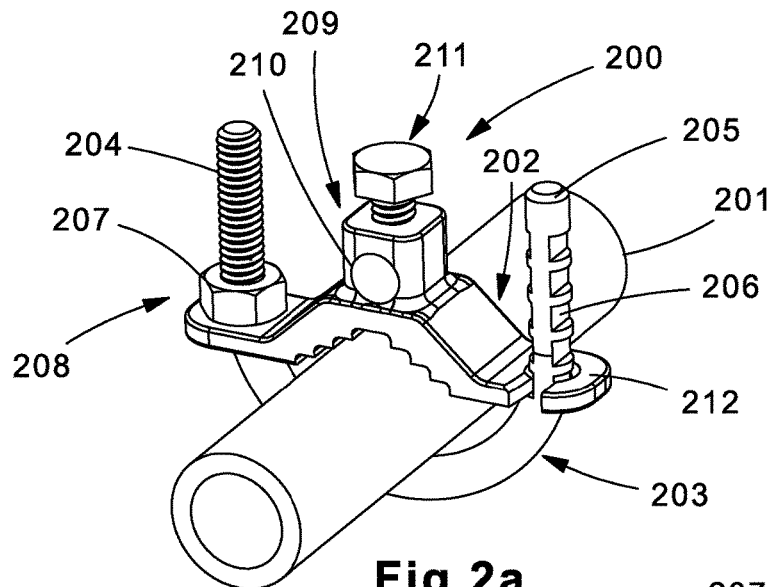
FIGS. 2a-2c are illustrations of another example implementation of a grounding clamp.
Figure 2B:
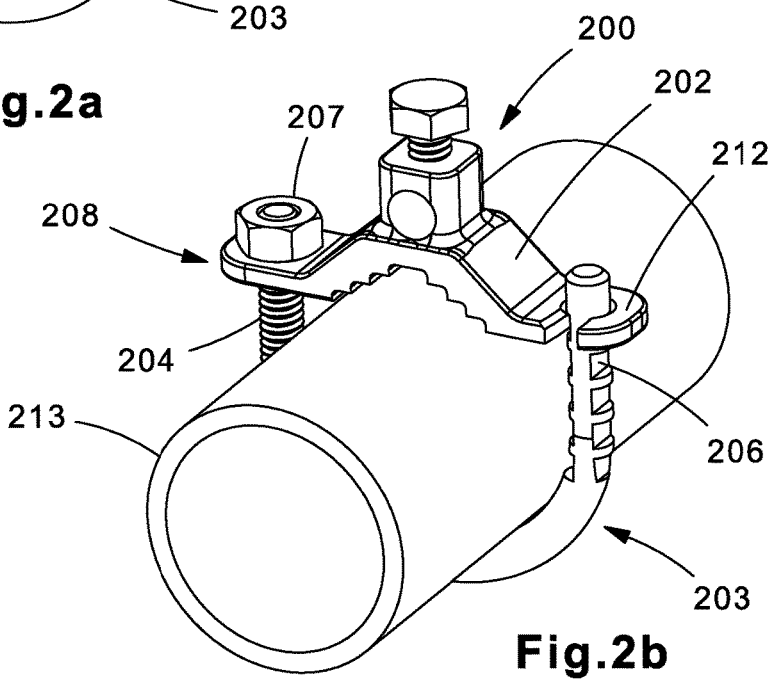
Figure 2C:
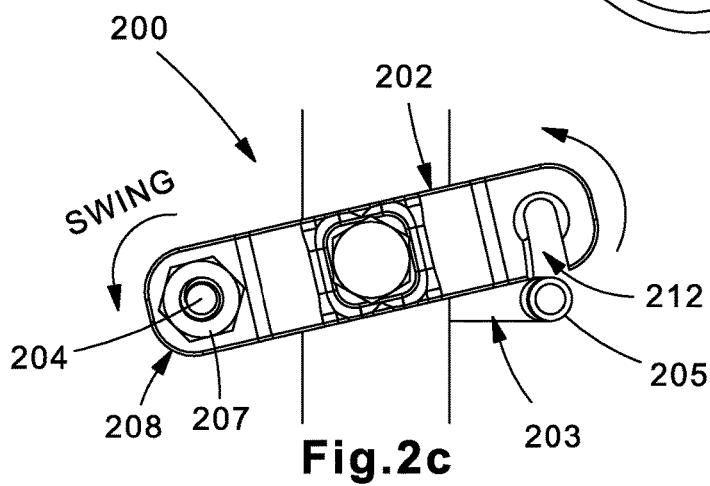
Figure 3A:
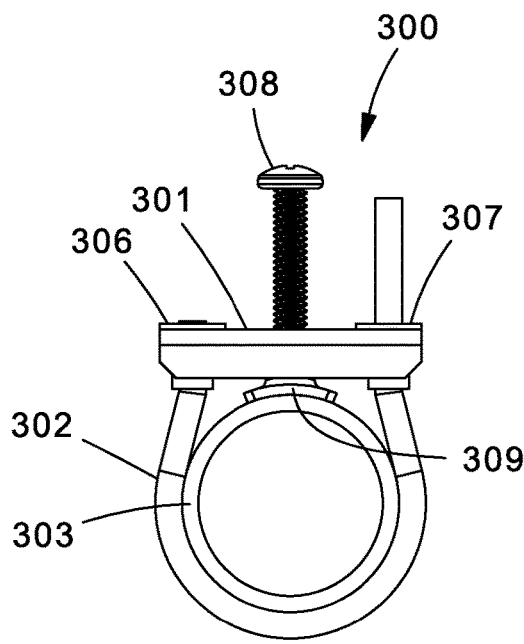
FIGS. 3a-3d are illustrations of another example implementation of a grounding clamp.
Figure 3B:
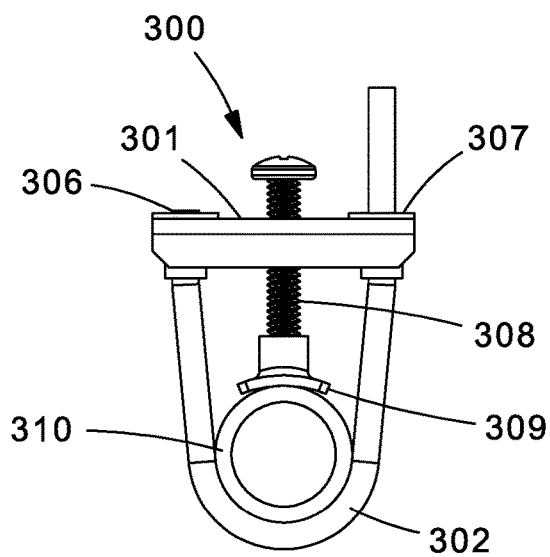
Figure 3C:
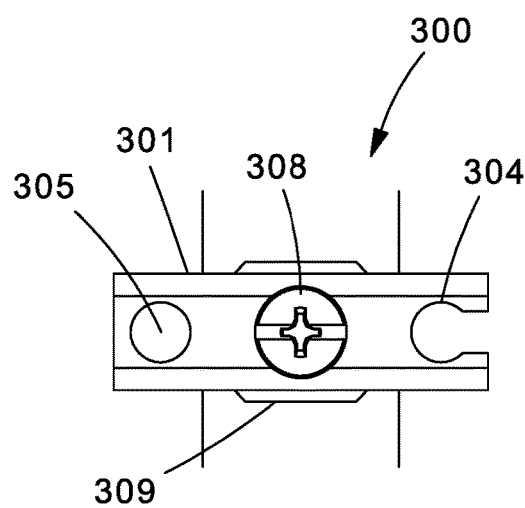
Figure 3D:
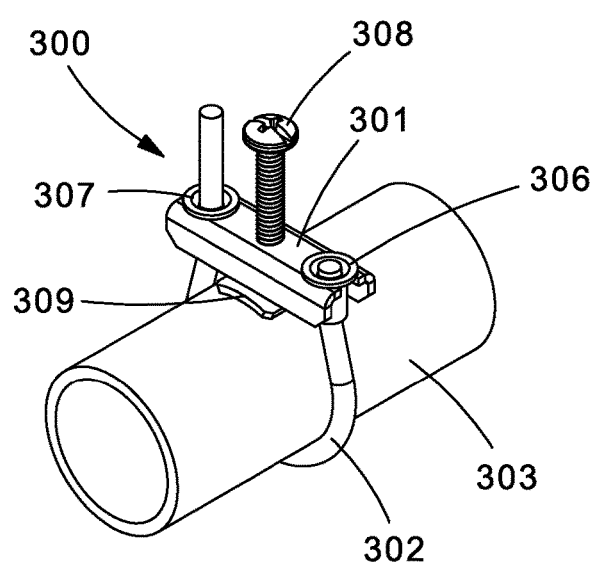

FIGS. 2a-2c are illustrations of an example grounding clamp 200. Grounding clamp 200 may be a swing-style clamp. Grounding clamp 200 may be formed by a top half 202 and a bottom U-shaped bolt 203. Top half 202 may have a concave center and a hook 212 one end. U-shaped bolt 203 may have a threaded end 204 that protrudes through a hole (not shown) in an end of top half 202 opposite the hook 212 end, and a plurality of notches 206 along an opposite end 205 corresponding to the hook 212 end of top half 202. Top jaw 202 and bottom U-shaped bolt 203 may be formed of a conductive material, such as a material with at least 80% copper (e.g., brass alloy, copper, etc.), so as to provide a grounding path between a grounding conductor (not shown) and the structure (e.g., pipe 201, pipe 213, etc.) to which grounding clamp 200 is attached. In some implementations, only top jaw 202 may be formed of a conductive material to save costs.

Bottom U-shaped bolt 203 may be attached to top half 202 at each end in order to attach grounding clamp 200 to a structure. As stated above, U-shaped bolt 203 may have a threaded end 204 that protrudes through a hole (not shown) in a first end of top half 202. Threaded end 204 may be secured to the first end of top half 202 via a nut 207. The attachment point 208 may serve as a pivot point for top half 202. Top half 202 may rotate relative to bottom U-shaped bolt 203 about pivot point 208 to open and close grounding clamp 200.

To install grounding clamp 200 over a structure, such as pipe 201 for example, the installer may rotate top half 202 relative to bottom U-shaped bolt 203 so that there is enough room to fit pipe 201 into the recess between top half 202 and bottom U-shaped bolt 203. If there is not enough room, the installer may loosen nut 207 to provide more space. Once pipe 201 is in the recess, the installer may rotate top half 202 about pivot point 208 so that grounding clamp 200 is partially closed over pipe 201. From there, the installer may tighten nut 207 until top half 202 and bottom U-shaped bolt 203 fit snugly over pipe 201. Finally, the installer may fully swing top half 202 about pivot point 208 so that hook 212 engages a notch 206 on end 205 of bottom U-shaped bolt 203. The installer may select which notch 206 to engage with hook 212 to ensure that each side of grounding clamp 200 applies even clamping force on pipe 201. As shown in FIGS. 2a and 2b, nut 207 may be adjusted to accommodate different sized structures. For example, pipe 213 is larger in diameter than pipe 201, and thus nut 207 is adjusted closer to the end of end 204 of bottom U-shaped bolt 203 and hook 212 engages a notch 206 closer to the end of end 205.

The grounding conductor may be attached to grounding clamp 200 at attachment port 209. Attachment port 209 may include a through hole 210 in top half 202 and a securing screw 211. The installer may place an end of the grounding conductor through through hole 210 and tighten securing screw 211 to secure the grounding conductor in place. Securing screw 211 may be implemented as a Philips head, slotted head, hex head, wing head, or any other equivalent fastener.

FIGS. 3a-3d are illustrations of another example grounding clamp 300. Grounding clamp 300 may be a flexible wrap type clamp. Grounding clamp 300 may be formed by a top bar 301 having a first notch 304 in a first end and a second notch 305 in a second end opposite the first end, a fastener 308, and a stabilizer pad 309. A grounding conductor 302 may be wrapped around a structure, such as a pipe 303 or pipe 310, thereby being directly grounded to the structure, and being held in place by top bar 301. A riveted end 306 of grounding conductor 302 attaches to top bar 301 in notch 305 and a riveted mid-portion 307 of grounding conductor 302 attaches to top bar 301 in notch 304. A portion of grounding conductor 302 between riveted end 306 and riveted mid-portion 307 wraps around the structure, and fastener 308 is torqued to push stabilizer pad 309 against the structure, thereby pulling grounding conductor 302 tight against the structure between riveted end 306 and riveted mid-portion 307.

Instead of having another piece of material wrapping around the structure, grounding clamp 300 utilizes the grounding wire itself as the means of securing the grounding wire to the structure. This reduces the cost of the clamp in two ways: first, it eliminates extra material typically used to wrap around the clamp; and lower-cost non-conducting material may be used to form the top bar and stabilizer pad because they are not in the conducting path.

Fastener 308 may be implemented by many types of fasteners. In the example shown in FIGS. 3a-3d, fastener 308 may be a threaded fastener that extends through top bar 301. A torque may be applied to fastener 308 to loosen and tighten stabilizer pad 309 against the structure. In some implementations, fastener 308 may be implemented by the torque-controlled fasteners described below in reference to FIGS. 4a-4d and 5a-5c.

FIGS. 4a-4d are illustrations of an example fastener 400. Faster 400 may be used to implement any of the fasteners included in the grounding clamps described herein. Faster 400 may include a threaded screw 402 having a head 406 with a set of angled teeth 408 around its circumference at the bottom side of head 406. Head 406 may also have a cavity 409 in which a torqueing tool may be used to drive threaded screw 402.

Fastener 400 may also include a driving mechanism 401 having a driver 403 and set of angled teeth 407 around its circumference at a bottom side. Angled teeth 407 may be angled in the opposite direction as angled teeth 408 such that the two sets of teeth mate when driving mechanism 401 is pressed up against head 406. Driving mechanism 401 may be biased against head 406 by a spring 404, and spring 404 may be biased against driving mechanism 401 by a cross-pin 405. The angles of teeth 407 and 408 are such that teeth sets 407 and 408 act as a slip clutch. When an installer applies torque to driving mechanism 401 via driver 403, the torque is transferred to threaded screw 402 until a predetermined torque is exceeded, causing the sets of teeth 407 and 408 to slip past each other. As a result, no torque is transferred from driving mechanism 401 to threaded screw 402 above the predetermined amount of torque, thereby controlling the amount of torque applied to threaded screw 402.

Figure 4A:
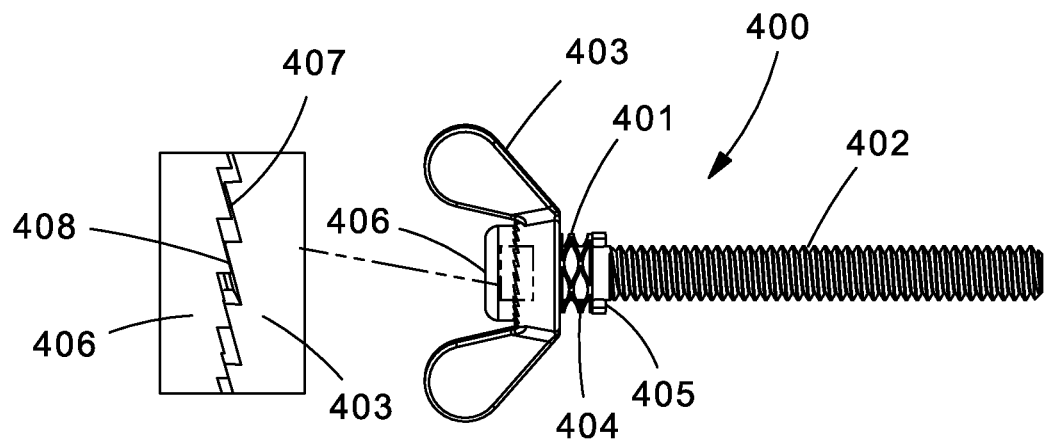
FIGS. 4a-4d are illustrations of an example implementation of a torque-controlled fastener system.
Figure 4B:
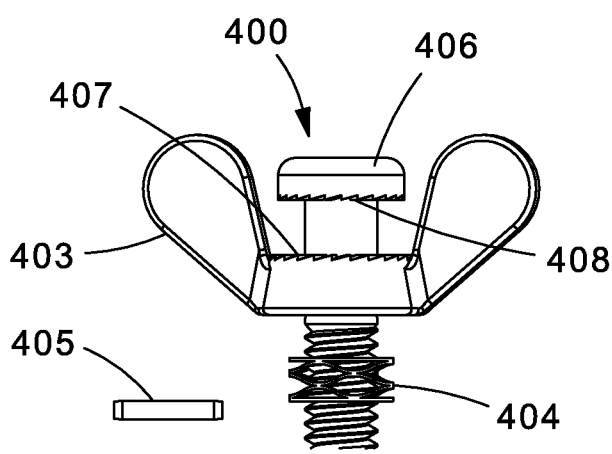
Figure 4C:
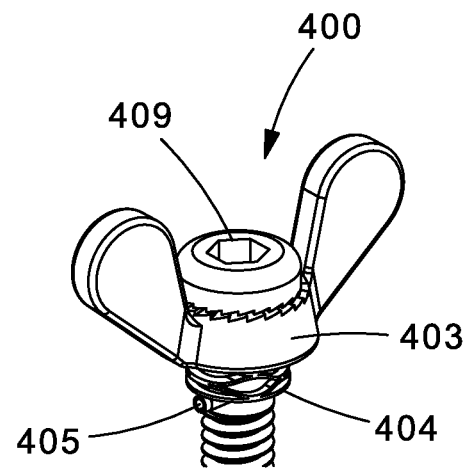
Figure 4D:
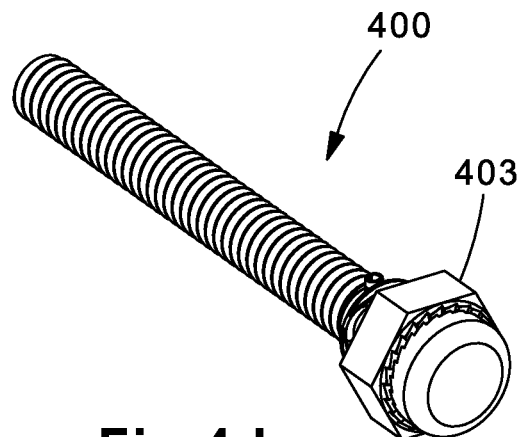

Various modifications to fastener 400 are contemplated within the scope of this disclosure. For example, driver 403 may be implemented as various types of drivers, including wing drivers (as shown in FIGS. 4a-4c), hex drivers (as shown in FIG. 4d), etc. As another example, cavity 409 may be shaped to accommodate various types of torqueing tools, such as hex drivers (as shown in FIG. 4c), Philips drivers, slotted drivers, Torx drivers, Robertson drivers, etc.

FIGS. 5a-5c are illustrations of a further example fastener 500. Faster 500 may be used to implement any of the fasteners included in the grounding clamps described herein. Faster 500 may include a threaded screw 502 having a head 506 with a cavity (not shown) in which a driver 504 of a driving mechanism 501 may be used to drive threaded screw 502.

Driving mechanism 501 may also have a head 503 and a break region 505 between head 503 and driver 504. When an installer applies torque to driving mechanism 501 via head 503, the torque is transferred to through break region 505 to driver 504, and from driver 504 to head 506 of threaded screw 502. Break region 505 may be structurally formed such that it shears and breaks when an amount of torque above a predetermined torque is applied to it. This may be achieved by controlling the thickness of the cross-section of break region 505, by using a combination of materials, etc. As a result, when the predetermined amount of torque is exceeded, driver 504 breaks off from driving mechanism 501 into the driving cavity in head 506 of threaded screw 502. Thus, no torque is transferred from driving mechanism 501 to threaded screw 502 above the predetermined amount of torque, thereby controlling the amount of torque applied to threaded screw 502.

Instead of creating an expensive custom-made threaded screw with an integrated break region, fastener 500 may include an inexpensive off-the-shelf threaded screw 502 along with an inexpensive disposable driving mechanism 501. Driving mechanism 501 may be shipped along with threaded screw 502 as separate pieces, or driving mechanism 501 may be press-fit into the cavity in head 506 of threaded screw 502 so that the chance of losing driving mechanism 501 is minimized. Break region 505 may be formed of a relatively soft material such that any of the break region 505 sticking out of the cavity in head 506 of threaded fastener 502 does not leave a sharp edge, thereby improving safety. Moreover, head 503 of driving mechanism 501 may include a cavity 507 so that a torqueing tool may be used to drive threaded screw 502 instead of head 503 of driving mechanism 501. Break region 505 transforms any torqueing tool used with cavity 507 into a torque-controlled tool, eliminating the need for specialized tools such as a torque wrench.

Various modifications to fastener 500 are contemplated within the scope of this disclosure. For example, head 503 may be implemented as various types of drivers, including wing drivers (as shown in FIGS. 5a-5c), hex drivers, or the like. As another example, cavity 507 and the cavity in head 506 may be shaped to accommodate various shapes of drivers, such as hex drivers (as shown in FIGS. 5a-5c), Philips drivers, slotted drivers, Torx drivers, Robertson drivers, etc.

Figure 6A:
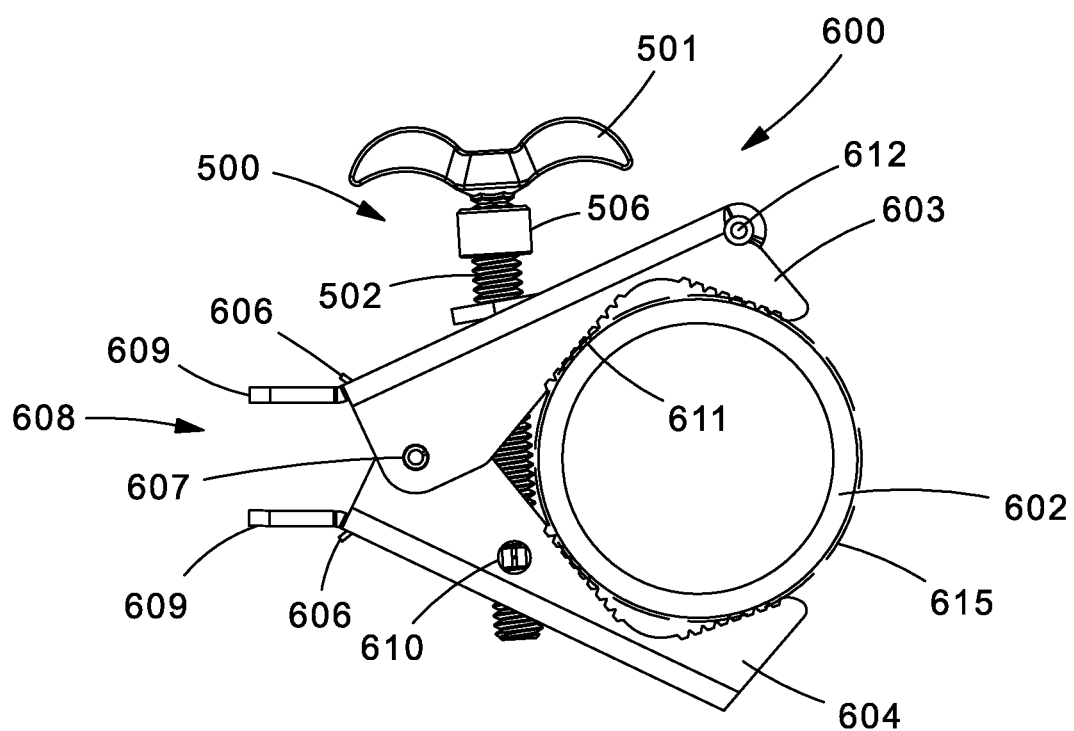
FIGS. 6a-6c are illustrations of a further example implementation of a grounding clamp.
Figure 6B:
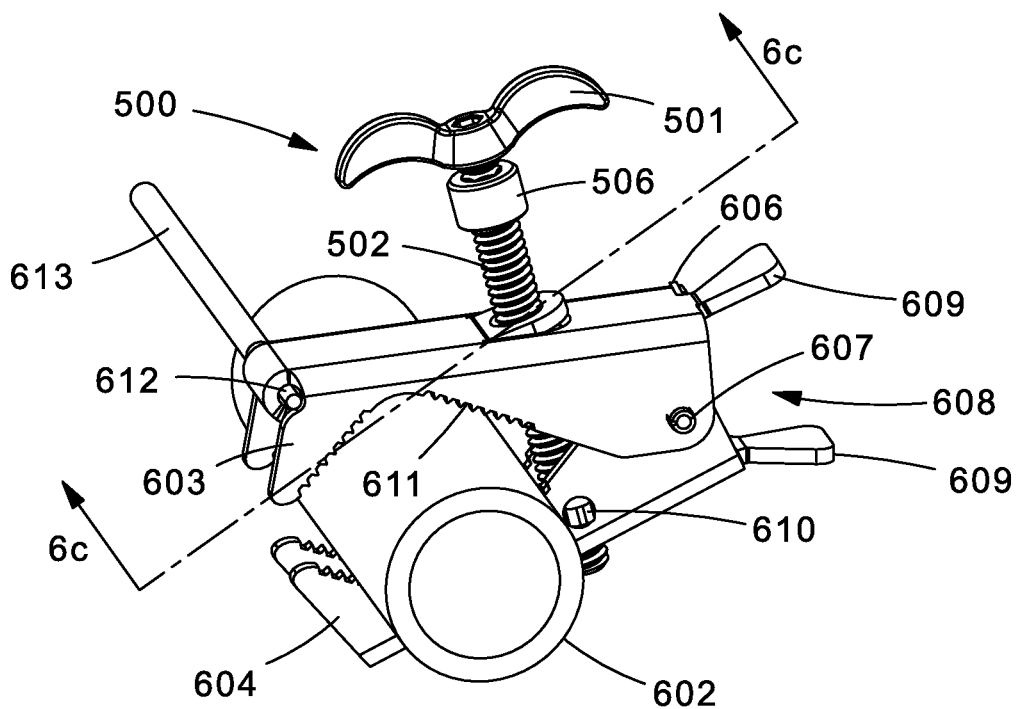
Figure 6C:
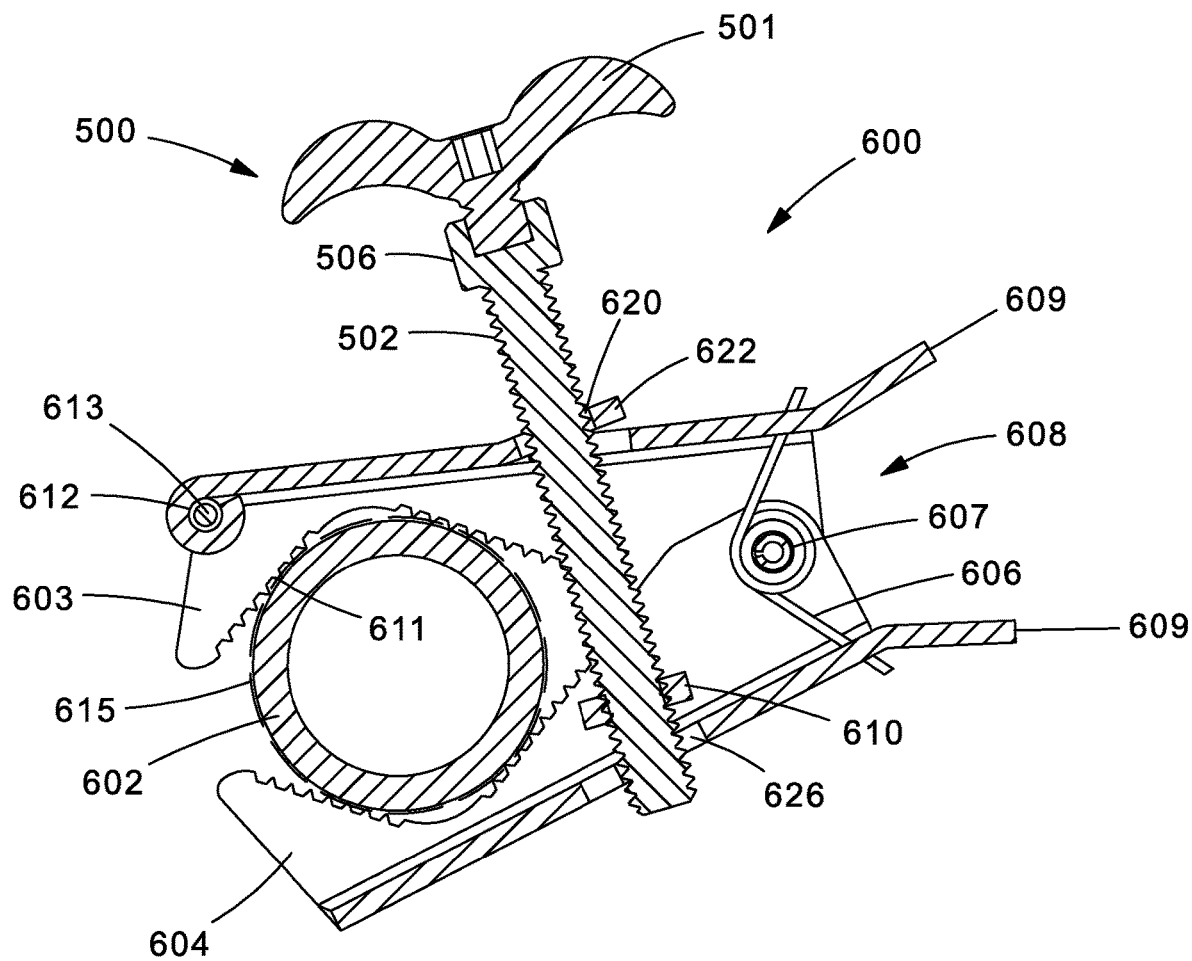

FIGS. 6a-6c depict a further example grounding clamp 600. FIG. 6a depicts a front plan view, FIG. 6b depicts a front perspective view, and FIG. 6c depicts a front cross-sectional view along line 6c-6c.

Grounding clamp 600 may be a jaw-style clamp. The grounding clamp 600 includes a top jaw 603 and a bottom jaw 604. Top jaw 603 and bottom jaw 604 may be fixed together rotatable about a pivot point 607 at first end 608 via a pin. A torsion spring 606 may apply a torsion for and bias top jaw 603 and bottom jaw 604 in a closed position.

Top jaw 603 and bottom jaw 604 may each have a concave end such that a recess 615 is formed between the top jaw 603 and bottom jaw 604. Teeth 611 may be disposed about the recess 615. Recess 615 is configured to retain a structure (e.g., pipe 602) within grounding clamp 600. Recess 615 is configured to ensure that grounding clamp 600 remains secured to pipe 602 before and after fastener 500 is tightened. This allows for easy installation and tightening of grounding clamp 600. The torsion force applied by spring 606 independently holds the grounding clamp 600 in place against the pipe 602. An installer does not need to hold the grounding clamp 600 during installation. Teeth 611 may bite into pipe 602 to aid in securing grounding clamp 600 to pipe 602 as well as improving electrical conductivity by biting through any surface corrosion.

The grounding clamp 600 may be configured to attach to a grounding conductor 613. The grounding conductor 613 may be attached to grounding clamp 600 at attachment port 612. Attachment port 612 may be a portion of top jaw 603 that is formed into a rolled through-hole. The installer may place an end of grounding conductor 613 through attachment port 612 and crimp attachment port 612 to secure grounding conductor 613 in place.

As depicted in FIG. 6c, fastener 500 (FIGS. 5a-5c) extends through the top jaw 603 and bottom jaw 604. The fastener 500 extends through an opening 620 in a collar 622 of the top jaw 603. The diameter of the opening 620 is sized to be larger than the diameter of the fastener 502. This permits the fastener 500 to freely rotate in the collar 622.

Fastener 500 also extends through bottom jaw 604. Threaded screw 502 of the fastener 500 extends down through a nut 610. Nut 610 is integral with the bottom jaw 601. Fastener 500 further extends through an opening 626 of the bottom jaw 604. The threaded screw 502 of the fastener 500 is threadedly connected to the nut 610. The diameter of the opening 626 is sized to be larger than the outside diameter of the threaded screw 502. The opening 626 in the bottom jaw is configured to permit the threaded screw 502 to protrude through and freely spin within the opening 626.

To fit grounding clamp 600 over pipe 602, the installer may open the jaws of grounding clamp 600 by compressing tails 609 on top jaw 603 and bottom jaw 604 toward each other to overcome the biasing torsion force of spring 606. With the top jaw 603 and bottom jaw 604 of grounding clamp 600 opened, the installer may fit the grounding clamp 600 over pipe 602 so that pipe 602 is positioned in recess 615. The installer may let go of tails 609 so that the biasing torsion force of spring 606 causes the top jaw 603 and bottom jaw 604 to clamp around pipe 602.

The installer may then tighten fastener 500 to tighten top jaw 603 and bottom jaw 604 around the pipe 602 for final installation. As the installer turns the fastener 500, the threaded screw 502 engages the threads of the nut 610 and is threaded down through the opening 620 of the top jaw 604 and down and out the opening 626 of the bottom jaw 604. When the head 506 of the fastener 500 contacts the top jaw 603, the top jaw 603 is compressed towards the bottom jaw 604. As the top jaw 603 and bottom jaw 604 are closed, the grounding clamp 600 bites down on the pipe 602. The fastener 500 may continue to be rotated until the ideal compression force between the grounding clamp 600 and pipe 602 is reached.

Top jaw 603 and bottom jaw 604 may be formed using a stamping process. The jaws may each be made of a conductive material, such as a material with at least 80% copper, so as to provide a grounding path between a grounding conductor 613 and pipe 602 to which grounding clamp 600 is attached. In some implementations, only one of top jaw 603 and bottom jaw 604 may be formed of a conductive material to save costs. In this implementation, the jaw 603, 604 to which grounding conductor 613 is attached should be the jaw 603, 604 formed of conductive material to provide a grounding path to pipe 602.

Fastener 500, depicted in FIGS. 6a-6c, may be implemented by many types of fasteners. In some implementations, fastener 500 may be a torque-controlled fastener, such as the torque-controlled fastener described above in reference to FIGS. 4a-4d and 5a-5c. Other types of fasteners are also contemplated.

Note that while the present disclosure includes several embodiments, these embodiments are non-limiting, and there are alterations, permutations, and equivalents, which fall within the scope of this invention. Additionally, the described embodiments should not be interpreted as mutually exclusive, and, should instead be understood as potentially combinable if such combinations are permissive. It should also be noted that there are many alternative ways of implementing the embodiments of the present disclosure. It is therefore intended that claims that may follow be interpreted as including all such alterations, permutations, and equivalents as fall within the true spirit and scope of the present disclosure.

The invention claimed is:

1. A grounding clamp, comprising:
    a clamp including an upper jaw and a lower jaw rotatable about a pivot point at respective first ends and biased in a closed position by a spring, the upper jaw and the lower jaw each having a respective concave second end opposite the first end, the concave second ends of the upper jaw and the lower jaw forming a recess;
    a torque-controlled fastener extending through the upper jaw and at least partially through the lower jaw, wherein the torque-controlled fastener is configured to control a predetermined amount of force applied by the upper jaw and the lower jaw, by rotation of the upper jaw and the lower jaw about the pivot point.

2. The grounding clamp of claim 1, wherein the torque-controlled fastener includes a threaded portion including a first set of angled teeth;
    a driving mechanism including a second set of angled teeth and configured to loosen and tighten the torque-controlled fastener by applying a torque to the threaded portion; and
    a compression spring biasing the driving mechanism against a head of the threaded portion such that the first set of angled teeth mates with the second set of angled teeth,
    wherein the second set of angled teeth slips against the first set of angled teeth when the torque applied to the threaded portion by the driving mechanism exceeds a specified amount of torque.

3. The grounding clamp of claim 1, further comprising:
    an attachment port configured to accept a grounding conductor.

4. The grounding clamp of claim 1, wherein teeth are formed in the second ends of the upper jaw and lower jaw.

5. The grounding clamp of claim 1, wherein the spring applies a torsion force to the upper jaw and lower jaw about the pivot point.

6. The grounding clamp of claim 1, wherein the lower jaw includes a nut that is threadably connected to the torque-controlled fastener.

7. The grounding clamp of claim 1, wherein the upper jaw and lower jaw each include a protrusion extending from the first end configured to rotate the upper jaw and lower jaw against the spring bias.

8. A grounding clamp, comprising:
    an upper jaw and a lower jaw rotatable about a pivot point at respective first ends and biased in a closed position by a spring, the upper jaw and the lower jaw each having a respective concave second end opposite the first end, the concave second ends of the upper jaw and the lower jaw forming a recess;
    a fastener extending through the upper jaw and at least partially through the lower jaw, the fastener configured to adjust an amount of force applied by the upper jaw and the lower jaw, by rotation of the upper jaw and the lower jaw about the pivot point.

9. The grounding clamp of claim 8, further comprising:
    an attachment port configured to accept a grounding conductor.

10. The grounding clamp of claim 8, wherein teeth are formed in the second ends of the upper jaw and lower jaw.

11. The grounding clamp of claim 8, wherein the spring applies a torsion force to the upper jaw and lower jaw about the pivot point.

12. The grounding clamp of claim 8, wherein the lower jaw includes a nut that is threadably connected to the torque-controlled fastener.

13. The grounding clamp of claim 8, wherein the upper jaw and lower jaw each include a protrusion extending from the first end configured to rotate the upper jaw and lower jaw against the spring bias.

14. A torque-controlled fastener, comprising:
    a threaded portion including a first set of angled teeth;
    a driving mechanism including a second set of angled teeth, the driving mechanism to loosen and tighten the threaded screw by applying a torque to the threaded screw; and a compression spring biasing the driving mechanism against a head of the threaded portion such that the first set of angled teeth mates with the second set of angled teeth, wherein the second set of angled teeth slips against the first set of angled teeth when the torque applied to the threaded portion by the driving mechanism exceeds a specified amount of torque.

* * * * *